United States Patent [19]

Miller et al.

[11] Patent Number: 5,080,205

[45] Date of Patent: Jan. 14, 1992

[54] STEER-SENSITIVE VARIABLE DAMPING STRUT

[75] Inventors: Larry D. Miller, Rochester Hills; Harlan W. Charles, Harper Woods, both of Mich.

[73] Assignee: General Motors Corporation, Detroit, Mich.

[21] Appl. No.: 558,284

[22] Filed: Jul. 26, 1990

[51] Int. Cl.$^5$ .......................... B62D 6/06; B60G 17/00
[52] U.S. Cl. ........................... 188/299; 280/707; 188/319
[58] Field of Search ............... 188/281, 280, 278, 299, 188/318, 319, 314, 315, 321.11; 280/707, 702, 705

[56] References Cited

U.S. PATENT DOCUMENTS

| | | | |
|---|---|---|---|
| 1,810,233 | 6/1931 | Walden | 188/319 |
| 3,827,538 | 8/1974 | Morgan | 188/299 |
| 4,520,908 | 6/1985 | Carpenter | 188/299 X |
| 4,685,545 | 8/1987 | Fannin et al. | 188/299 |
| 4,757,884 | 7/1988 | Fannin et al. | 188/319 |
| 4,789,051 | 12/1988 | Kruckemeyer et al. | 188/299 |
| 4,800,994 | 1/1989 | Imaizumi et al. | 188/299 X |
| 4,800,995 | 1/1989 | Bernhardt et al. | 188/299 |
| 4,821,851 | 4/1989 | Kruckemeier et al. | 188/319 |
| 4,826,205 | 5/1989 | Kouda et al. | 188/299 |
| 4,948,163 | 8/1990 | Kikushima et al. | 188/299 |

FOREIGN PATENT DOCUMENTS 3737173  5/1989  Fed. Rep. of Germany ...... 188/319

*Primary Examiner*—Matthew C. Graham
*Attorney, Agent, or Firm*—A. Michael Tucker

[57] ABSTRACT

A hydraulic strut for use with a vehicle suspension system includes a reciprocating piston rod and piston in an inner cylinder. A piston valving assembly is carried by the piston and controls the flow of fluid between upper and lower chambers of the inner cylinder. A base valving assembly controls the flow of fluid from the inner cylinder to a reservoir. A bypass valving assembly, selectively dependent upon a rotation movement input when the vehicle is steered, permits fluid flow to travel between the upper and lower chambers of the inner cylinder without traveling through the piston valving assembly.

12 Claims, 7 Drawing Sheets

STEER-SENSITIVE VARIABLE DAMPING STRUT

BACKGROUND OF THE INVENTION

1. Field of the Invention

The present invention relates generally to hydraulic dampers. In particular, this invention is concerned with a twin tube strut having a reciprocating piston and piston rod mounted in a fluid-filled inner cylinder which provides variable damping dependent upon the rotation of an attached wheel assembly.

2. Brief Description of the Related Art

Hydraulic dampers, including shock absorbers and struts, are well-known in vehicle suspension systems. The rate of damping of a hydraulic strut is often tuned by a piston valving assembly and/or base valve assembly. Conventional piston and base valving assemblies employ various disk packs and spring-biased blow-off elements. During compression and rebound strokes of a strut, fluid flow through these valving assemblies determines the type of damping characteristic produced by the strut.

Many constructions have been developed to provide variable damping. In particular, it is well-known to provide a rotatable plate in a piston valving assembly to change the size of an orifice or other element to alter fluid flow through a piston valving assembly. Oftentimes, an electric motor is used to rotate a valve plate in a piston assembly.

The art continues to seek improvements. It is desirable to provide a variable damping strut to perform under different driving conditions. In particular, during straight-ahead motion of a vehicle, a "soft" ride increases the comfort of passengers. During a steering motion when the vehicle wheels are turned, a "firm" damping rate provides greater control of the vehicle. It is desirable to provide a strut which can vary the damping rate dependent upon these driving conditions.

SUMMARY OF THE INVENTION

The present invention includes a hydraulic strut for use with a vehicle suspension system. The present strut provides a variable two-stage damping performance dependent upon the turning motion of an attached wheel assembly. The valving means is an economical system which can be incorporated into conventional strut components. During straight-ahead driving, a soft damping rate is provided. During a turning or cornering motion, hard or stiff damping enhances control of the vehicle.

In a preferred embodiment, the present invention includes a hydraulic strut for use with a vehicle suspension system. The strut includes a reciprocating piston rod and piston in an inner cylinder. A piston valving assembly is carried by the piston and controls the flow of fluid between upper and lower chambers of the inner cylinder. A base valving assembly controls the flow of fluid from the inner cylinder to a reservoir. A bypass valving assembly, selectively dependent upon a rotation movement input when the vehicle is steered, permits fluid flow to travel between the upper and lower chambers of the inner cylinder without traveling through the piston valving assembly.

BRIEF DESCRIPTION OF THE DRAWINGS

FIG. an exploded perspective view of a vehicle suspension system incorporating a first embodiment of the present steer-sensitive variable strut operatively mounted between a vehicle body and a road wheel assembly.

DETAILED DESCRIPTION OF THE DRAWINGS

Figure 1:
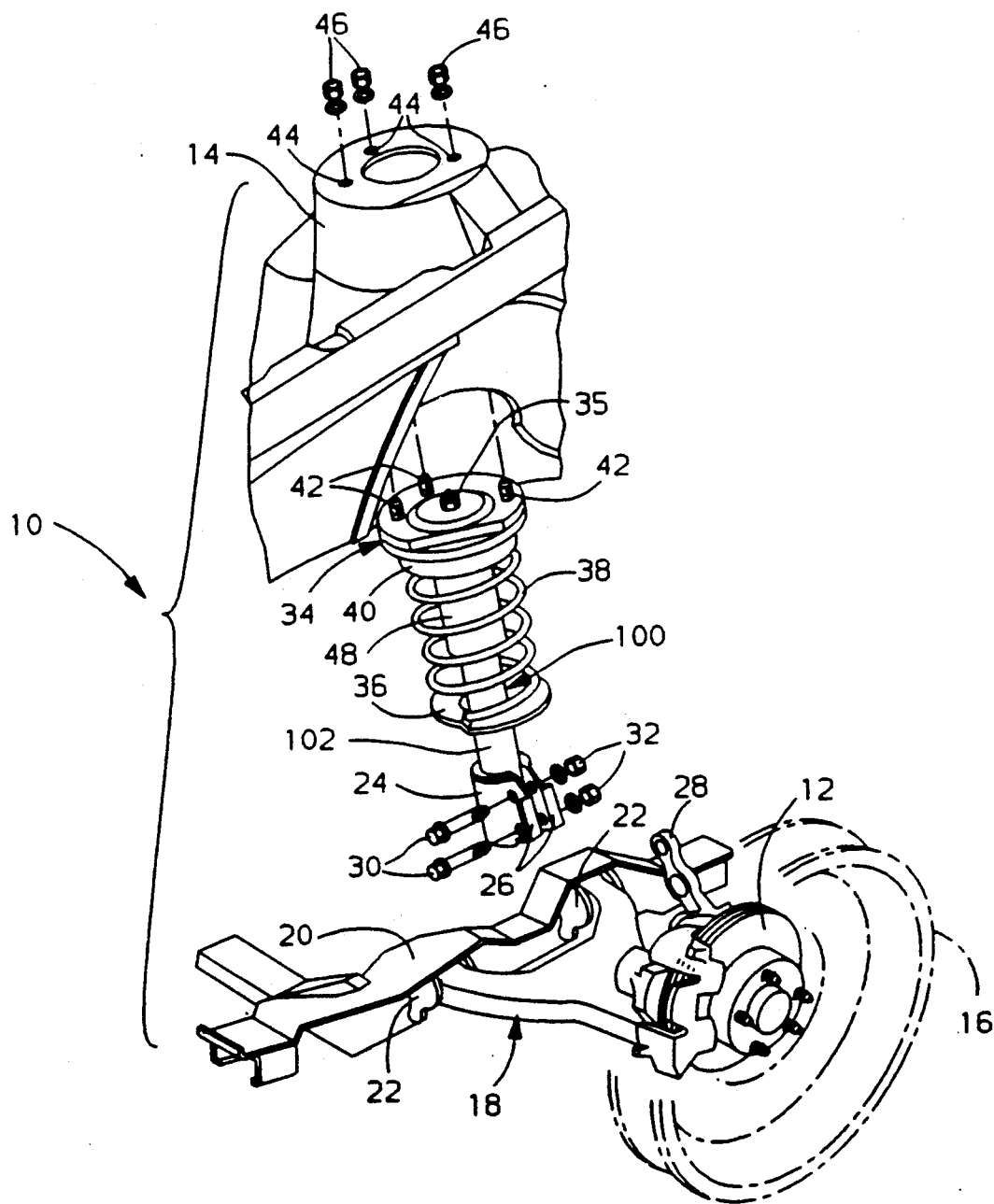

FIG. 1 illustrates a vehicular suspension system indicated generally at 10. A first embodiment of a steerable suspension strut indicated generally at 100 is operatively mounted between a spindle and hub assembly 12 and a mounting tower 14 formed in a vehicular body. The spindle and hub assembly 12 rotatably supports a wheel 16 and is mounted on the outer end of a control arm assembly 18 by a conventional ball joint (not illustrated). The control arm assembly 18 is pivotally mounted at its inboard end to the vehicular frame 20 by pivot shafts 22.

The strut 100 includes a cylindrical reservoir tube 102 mounted at its lower end within a partially cylindrical mounting bracket 24 having radially extending flanges 26 that are spaced from one another in side-by-side relationship to receive an upstanding arm 28 of the spindle and hub assembly 12. Threaded fasteners 30 extend through aligned openings in the mounting bracket flanges 26 and arm 28 and threadedly receive nuts 32 to secure the reservoir tube 102 in the mounting bracket 24.

A tubular piston rod 104 telescopically projects from an upper end of the reservoir tube 102 into attachment with a strut mounting assembly 34 and is secured thereto by a nut 35 threaded on the end of the piston rod 104. A particular strut mounting assembly suitable for this application is disclosed in U.S. Pat. No. 4,256,292 issued Mar. 17, 1981 and titled "Resilient Mount For MacPherson Strut." U.S. Pat. No. 4,256,292 is assigned to the present assignee and hereby incorporated by reference.

A lower spring seat 36 is secured to the reservoir tube 102 and mounts a lower end of a helical vehicle suspension spring 38. The upper end of the suspension spring 38 is mounted on an upper spring seat 40 of the strut mounting assembly 34. Attachment bolts 42 project upwardly from the strut mounting assembly 34 through complementary openings 44 in the mounting tower 14 to receive nuts 46 which secure the strut mounting assembly 34 to the vehicular body. A cylindrical dust shield 48 is secured to the strut mounting assembly 34 and covers the extended portion of the piston rod 104.

The strut mounting assembly 34 permits the rotation of the reservoir tube 102 with the spindle and hub assembly 12 in a conventional manner whenever the wheel 16 is turned to steer the vehicle. Concurrently, the piston rod 104 is secured to the strut mounting assembly 34 by the nut 36 and remains fixed relative to the vehicular body, thereby resulting in relative rotational motion between the reservoir tube 102 and the piston rod 104.

Figure 2:
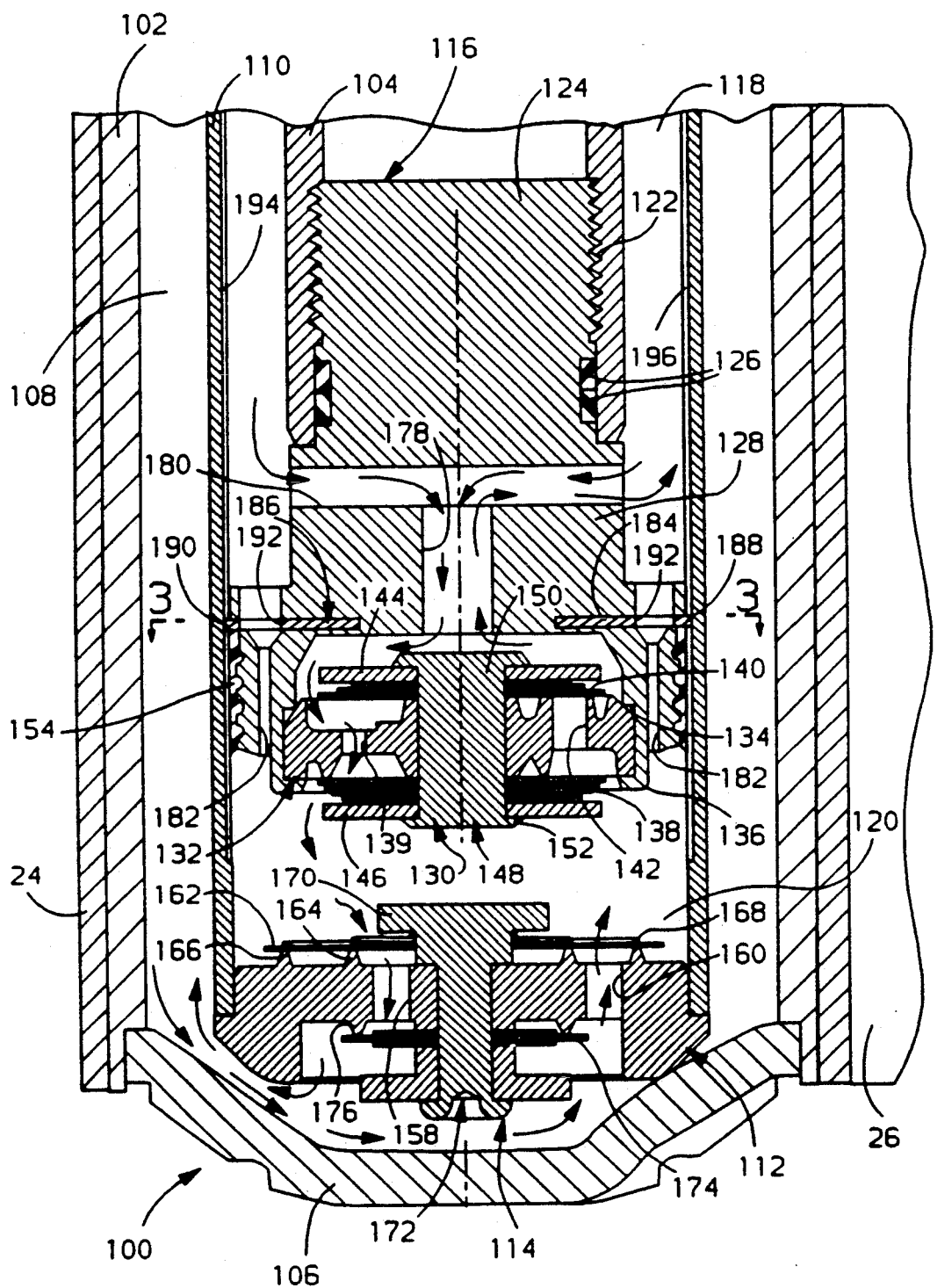
FIG. 2 is an axial sectional view of a lower portion of the strut of FIG. 1 removed from the suspension system for purposes of clarity of illustration.

The lower portion of the strut 100 is illustrated in FIG. 2 and removed from the suspension system 10 of FIG. 1 for purposes of clarity of illustration. As described above, the strut 100 includes the cylindrical reservoir tube 102 mounted in the partially cylindrical bracket 24. A base cup 106 is welded to and closes the lower end of the reservoir tube 102. The reservoir tube 102 surrounds and forms a fluid reservoir 108 with an inner cylinder 110. A cylinder end 112, fitted to and closing the inner cylinder 110, is seated in the base cup 106. A conventional base valve assembly 114 is mounted on the cylinder end 112 and controls the flow of fluid passing between the interior volume of the inner cylinder 110 and the reservoir 108 as described below.

A piston indicated generally at 116 is mounted to the lower end of the elongated, hollow cylindrical piston rod 104. The piston 116 divides the interior volume of the inner cylinder 110 into an upper chamber 118 and a lower chamber 120. The piston 116 can be secured to the piston rod 104 by any suitable means, including by a threaded connection at 122 with an upstanding neck 124 of the piston 116. The interior of the piston rod 104 is hydraulically sealed from the fluid within the strut 100 by O-ring seals 126 disposed between the neck 124 and the inner wall of the piston rod 104. In other embodiments, the piston 116 can be welded to a solid, cylindrical piston rod 104.

A base portion 128 of the piston 116 carries a piston valving assembly 130 to control the flow of fluid between the upper and lower chambers 118,120 as described below. The piston valving assembly 130 includes a cylindrical orifice plate 132 peripherally secured in the base portion 128 between an inner locator shoulder 134 and a radially inwardly coined annular skirt 136. A lower valve spring disk pack 138 comprised of a series of flat washer-like valve disks of spring steel having decreasing diameters top to bottom is mounted adjacent to a bottom surface of the orifice plate 132 to deflect downwardly in response to hydraulic fluid traveling through passage 139 during the rebound stroke.

An upper valve spring disk pack 140 similar to disk pack 138 is comprised of a series of flat washer-like valve disks mounted adjacent a top surface of the orifice plate 132. The upper valve spring disk pack 140 deflects in response to hydraulic fluid traveling through passage 142 during the compression stroke. The spring disk packs 138,140 are held in operative position between upper and lower limit plates 144,146 by a centralized rivet 148 having upper and lower coined ends 150,152, respectively. An annular sealing band 154, preferably formed from TEFLON, is provided around the circumference of the base portion 128 and forms a seal against an inner surface of the inner cylinder 110.

The base valve assembly 114 includes the cylinder end 112 having a damping port 158 and a return port 160. A slotted valve disk 162 is mounted on annular seats 164,166 on an upper surface of the cylinder end 112 and held in place by a spring 168 seated against a flanged end 170 of a centralized connector 172. A valve disk pack 174 is provided on an annular seat 176 on the lower surface of the cylinder end 112. During a compression stroke of the strut 100, the valve disk pack 174 deflects downwardly as fluid flows from the lower chamber 120 of the inner cylinder 110 through the damping port 158 to the reservoir 108. During a rebound stroke, the valve disk 162 is pushed away from seats 164,166 as fluid returns from the reservoir 108 through the return port 160 to the lower chamber 120.

During operation, fluid in the inner cylinder 110 passes between the upper chamber 118 and the upper valve spring disk pack 140 through an internal axial channel 178 in communication with a plurality of radial channels 180 provided in the neck 124 of the piston 116. It is appreciated that other fluid channel configurations are within the scope of this invention.

A plurality of fluid bypass channels 182 are provided in the base portion 128 of the piston 116 radially outbound of the piston valving assembly 130. The bypass channels 182 are aligned substantially parallel with the axis of the piston rod 104 and are in fluid communication with the upper and lower chambers 118,120. A circumferential groove 184 is provided in the base portion 128 of the piston 116 and has a depth of a predetermined distance radially inbound of the bypass channels 182.

The groove 184 acts as a seat for a rotatable control disk 186. The control disk 186, illustrated best in FIGS. 3 and 4, includes a pair of circumferential tabs 188,190 and a plurality of ports 192 radially aligned with the bypass channels 182. The tabs 188,190 are received within respective axial slots 194,196 provided in the inner circumference of the inner cylinder 110. Each slot 194,196 is formed for a predetermined length along the inner cylinder 110.

In operation, the upward and downward motion of the vehicle suspension system 10 due to road inputs results in compression and rebound of the strut 100. During compression, the piston rod 104 and piston 116 are slidably forced downwardly toward the base valve assembly 114. Fluid is forced from the lower chamber 120 into the reservoir 108 through the base valve assembly 114 as described above. Concurrently, fluid passes into the upper chamber 118 through the piston valving assembly 130 as described above.

Figure 3:
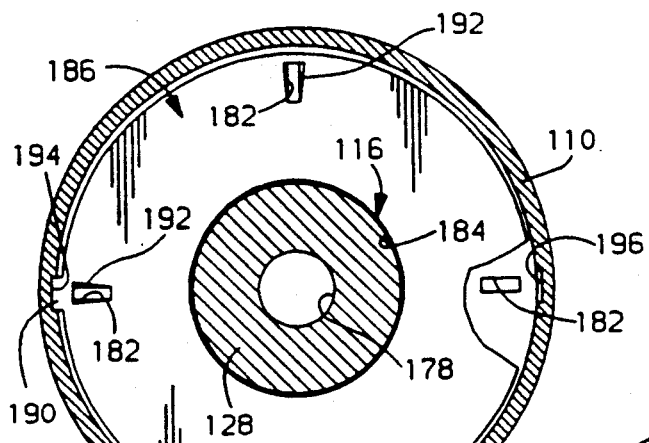
FIG. 3 is a sectional view taken along line 3—3 of FIG. 2 illustrating fluid ports in a control disk aligned with respective bypass channels in a piston for permitting fluid flow between upper and lower fluid chambers in an inner cylinder.
Figure 4:
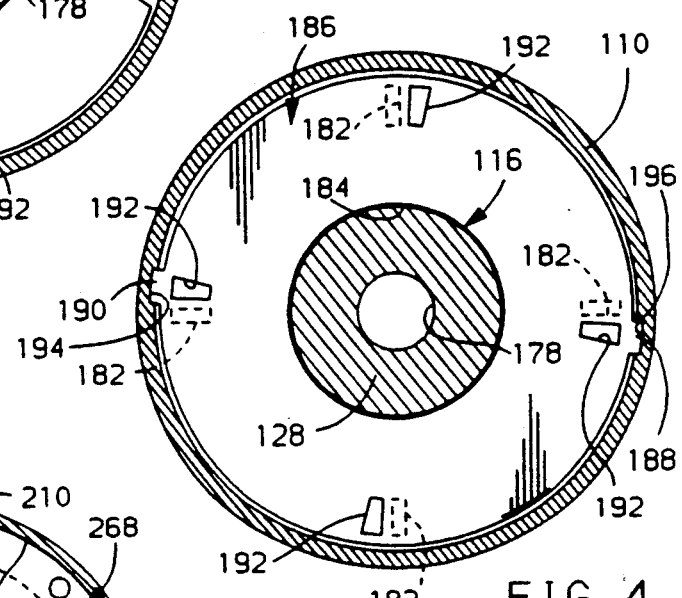
FIG. 4 is a view similar to FIG. 3 wherein the inner cylinder and control disk have been rotated a clockwise direction so that the ports are not aligned with the bypass channels, thereby blocking fluid flow.

When the vehicle wheels and tires are aligned to provide straight movement of the vehicle, the ports 192 in the control disk 186 are aligned with the bypass channels 182 as illustrated in FIGS. 2 and 3, thereby permitting additional flow from the lower chamber 120 into the upper chamber 118. When the wheels and tires are turned with respect to the body to steer the vehicle, the turning motion is translated through the spindle and hub assembly 12 and the mounting bracket 24 to the reservoir tube 102 and the inner cylinder 110. At such time, the tabs 190,192 in the axial slots 194,196 cause the rotation of the valve disk 186 with respect to the piston 116 so that the ports 188 are no longer aligned with the bypass channels 182, as illustrated in FIG. 4, thereby blocking flow through the bypass channels 182.

As described above, the present strut 100 provides a two-stage damper. The first stage occurs when the ports 188 are aligned to open the bypass channels 182, thereby permitting the flow of fluid and providing for a "soft" damping rate. The second stage occurs when the ports 188 with the bypass channels 182 are not aligned due to the rotation of the valve disk 186 with respect to the piston 116. In the second stage, a "hard" damping rate occurs as fluid passes from the lower chamber 120 to the upper chamber 118 only through the piston valving assembly 130.

Depending upon the degree of rotation imparted by the spindle and hub assembly 12, a range of damping characteristics can be achieved with the strut 100. For example, ports 188 can be sized to begin restricting fluid flow in the bypass channels 182 with as little as 3-5 degrees of rotation of the control disk 186.

Figure 5:
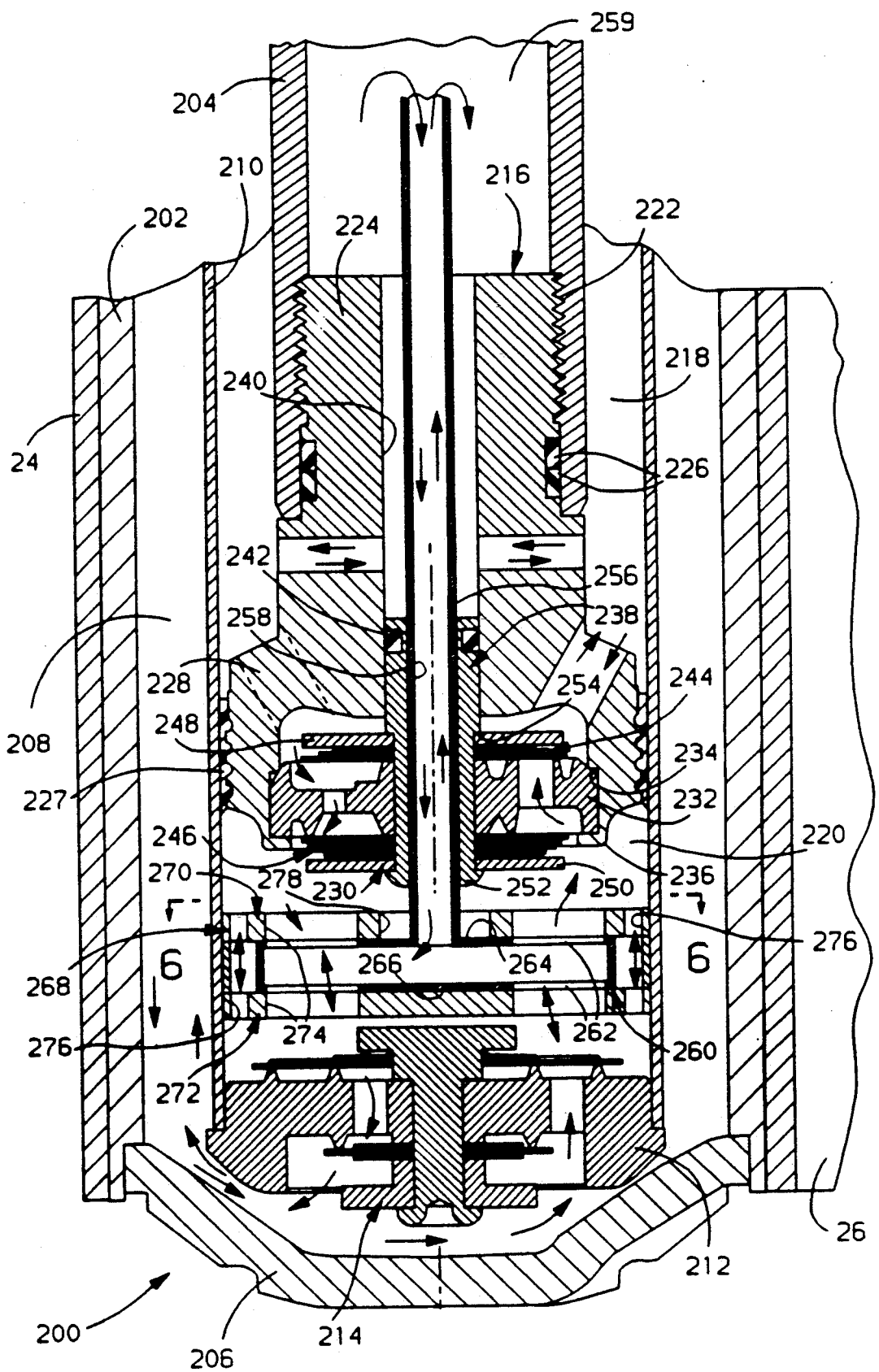
FIG. 5 is an axial sectional view of a lower portion of a second embodiment of the present steer-sensitive variable strut illustrating a bypass tube axially mounted in and drivingly connected to a piston for permitting fluid flow between the upper and lower chambers in the inner cylinder.

A second preferred embodiment of a steer-sensitive variable strut is indicated generally at 200 and illustrated in FIG. 5. The strut 200 is substituted for the strut 100 in the vehicle suspension system 10 illustrated in FIG. 1.

The strut 200 includes a cylindrical reservoir tube 202 mounted at its lower end within the partially cylindrical bracket 24. A tubular piston rod 204 telescopically projects from an upper end of the reservoir tube 202 and is attached by the nut 35 (FIG. 1) to the strut mounting assembly 34. A base cup 206 is welded to and closes the lower end of the reservoir tube 202. The reservoir tube 202 surrounds and forms a reservoir 208 with an inner cylinder 210. A cylinder end 212 is fitted to and closes the inner cylinder 210. A conventional base valve assembly 214 is mounted on the cylinder end 210 and controls the flow of fluid passing between the interior volume of the inner cylinder 210 and the reservoir 208.

A piston indicated generally at 216 is mounted to the lower end of the hollow, cylindrical piston rod 204. The piston 216 divides the interior volume of the inner cylinder 210 into an upper chamber 218 and a lower chamber 220. The piston 216 can be secured to the piston rod 204 by any suitable means, including by a threaded connection at 222 with an upstanding neck 224 of the piston 216. The interior of the piston rod 204 is hydraulically sealed from the fluid within the strut 200 by O-ring seals 226 disposed between the neck 224 and the inner wall of the piston rod 204.

An annular sealing band 227, preferably formed from TEFLON, is provided around the circumference of a base portion 228 of the piston 216. The base portion 228 carries a piston valving assembly 230 to partially control the flow of fluid between the upper and lower chambers 218,220. The piston valving assembly 230 includes a cylindrical orifice plate 232 peripherally secured in the base portion 228 between an inner locator shoulder 234 and a radially inwardly coined annular skirt 236. A centralized mounting connector 238 projects downwardly from an axial channel 240 provided in the piston 216. The connector 238 is secured by any suitable means and carries an O-ring seal 242. Upper and lower valve spring disk packs 244,246 are mounted adjacent to respective surfaces of the orifice plate 232 and deflect in response to hydraulic fluid in a manner similar to the valve spring disk packs 138,140 of the strut 100. The disk packs 244,246 are held in operative positions between upper and lower limit plates 248,250 and a coined end 252 and an annular seat 254 on the mounting connector 238.

Figure 6:
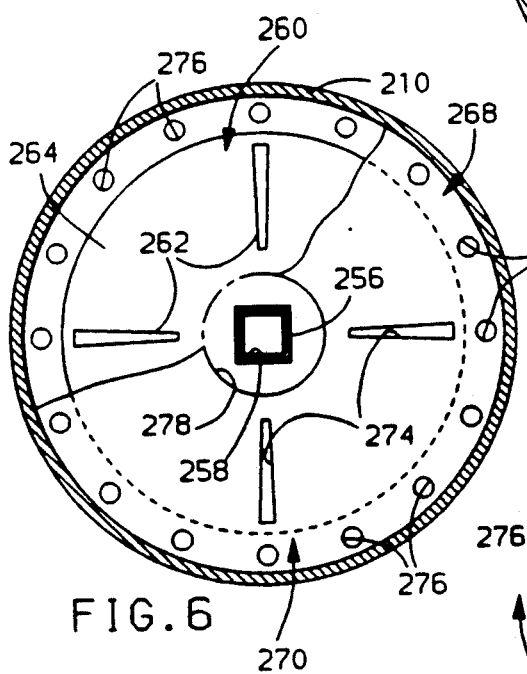
FIG. 6 is a sectional view taken along line 6—6 of FIG. 5 illustrating a rotatable control plate assembly connected to the bypass tube including fluid passages aligned with complementary passages in a receiver plate.
Figure 7:
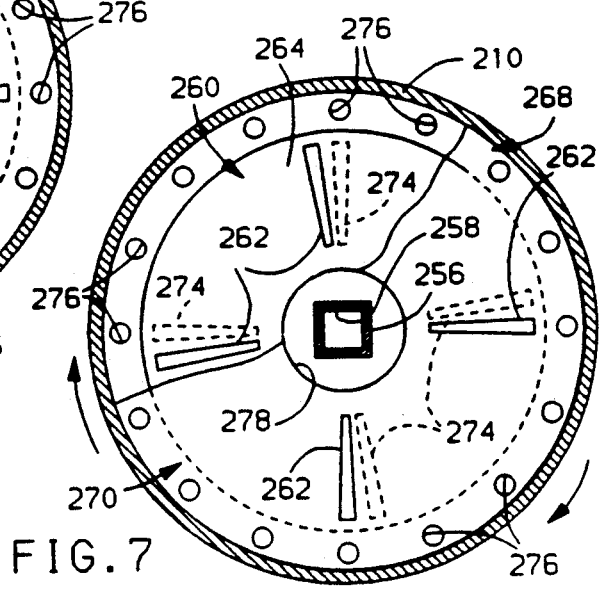
FIG. 7 is a view similar to FIG. 6 illustrating the disalignment of fluid passages in the control plate and receiver plate assemblies caused by the clockwise rotation of a reservoir tube resulting from a steering operation of a wheel assembly.

A hollow bypass tube 256 having a rectangular cross section (FIGS. 6 and 7) is received in a central axial opening 258 of the mounting connector 238 and extends upwardly into an interior fluid chamber 259 provided in the piston rod 204. The opening 258 in the mounting connector 238 is a complementary rectangular cross section thereby forming a driving fit between the bypass tube 256, the mounting connector 238 and the piston 216. As the piston rod 204 reciprocates in the inner cylinder 210, the mounting connector 238 slides along the predetermined length of the bypass tube 256.

The lower end of the bypass tube 256 terminates in a cylindrical hollow control plate assembly 260 having a plurality of ports 262 provided in upper and lower surfaces 264,266. The control plate assembly 260 is rotatably mounted in a cylindrical receiver plate assembly 268 comprised of upper and lower plates 270,272. Each plate 270,272 has a plurality of openings 274 which can selectively align with the ports 262 of the control plate assembly 260. A plurality of unrestricted flow passages 276 are provided in the outer periphery of the receiver plate assembly 268 radially outbound of the control plate assembly 260. The receiver plate assembly 268 is secured to the inner surface of inner cylinder 210 in the lower chamber 220 adjacent the cylinder end 212 by any suitable manner, e.g., welding. A central opening 278 in the upper plate 270 permits unrestricted rotation of the bypass tube 256 and control plate assembly 260 with respect to the receiver plate assembly 268 as described below.

In operation, the strut 200 provides two-stage variable damping. First, when the wheels of the vehicle are straight, the ports 262 of the control plate assembly 260 are aligned with the openings 274 of the receiver plate assembly 268. Fluid in the lower chamber 220 can pass freely between these aligned ports 262 and openings 274 and produce a "soft" damping rate. Fluid in the control plate assembly 260 passes into the bypass tube 256 and travels to the interior chamber 259 of the piston rod 204 as the piston rod 204 and piston 216 reciprocate in the inner cylinder 210. Concurrently, fluid passes through the outer flow passages 276, the piston valving assembly 230 and the base valve assembly 214.

A turning motion of the spindle and hub assembly 12 to steer a vehicle results in the rotation of the reservoir tube 202 and attached inner cylinder 210 as described above for strut 100. When the inner cylinder 210 rotates, a relative rotational motion occurs between the receiver plate assembly 268 and the control plate assembly 260 and the bypass tube 256. The bypass tube 256 does not rotate with the inner cylinder 210 because of the driving fit between the complementary cross sections of the bypass tube 256 and the axial opening 258 of the mounting connector 238. As described above, the piston rod 204 does not rotate with the spindle and hub assembly 12 because of the connection provided by the strut mounting assembly 34. A second stage of damping occurs when the receiver plate assembly 268 is rotated, thereby closing the alignment between the ports 262 and the openings 274. In this mode, a "hard" damping rate is created as fluid is permitted to pass only through the outer flow passages 276, the piston valving assembly 230 and the base valving assembly 214.

Figure 8:
FIG. 8 is an axial sectional view of a third embodiment of the present steer-sensitive strut illustrating an axially slotted piston rod slidably mounting an axially slotted bypass tube for permitting fluid flow between the upper and lower chambers in the inner cylinder.

A third preferred embodiment of a steer-sensitive variable strut is indicated generally at 300 in FIG. 8. The strut 300 is substituted for the strut 100 in the vehicle suspension system 10 illustrated in FIG. 1.

The strut 300 includes a cylindrical reservoir tube 302 mounted at its lower end within the partially cylindrical mounting bracket 24. A tubular piston rod 304 telescopically projects from an upper end of the strut 300 and is attached by the nut 35 (FIG. 1) to the strut mounting assembly 34. A base cup 306 is welded to and encloses the lower end of the reservoir tube 302. The reservoir tube 302 surrounds and forms a reservoir 308 with an inner cylinder 310. A cylinder end 312 is fitted to and closes the inner cylinder 310.

Figure 12:
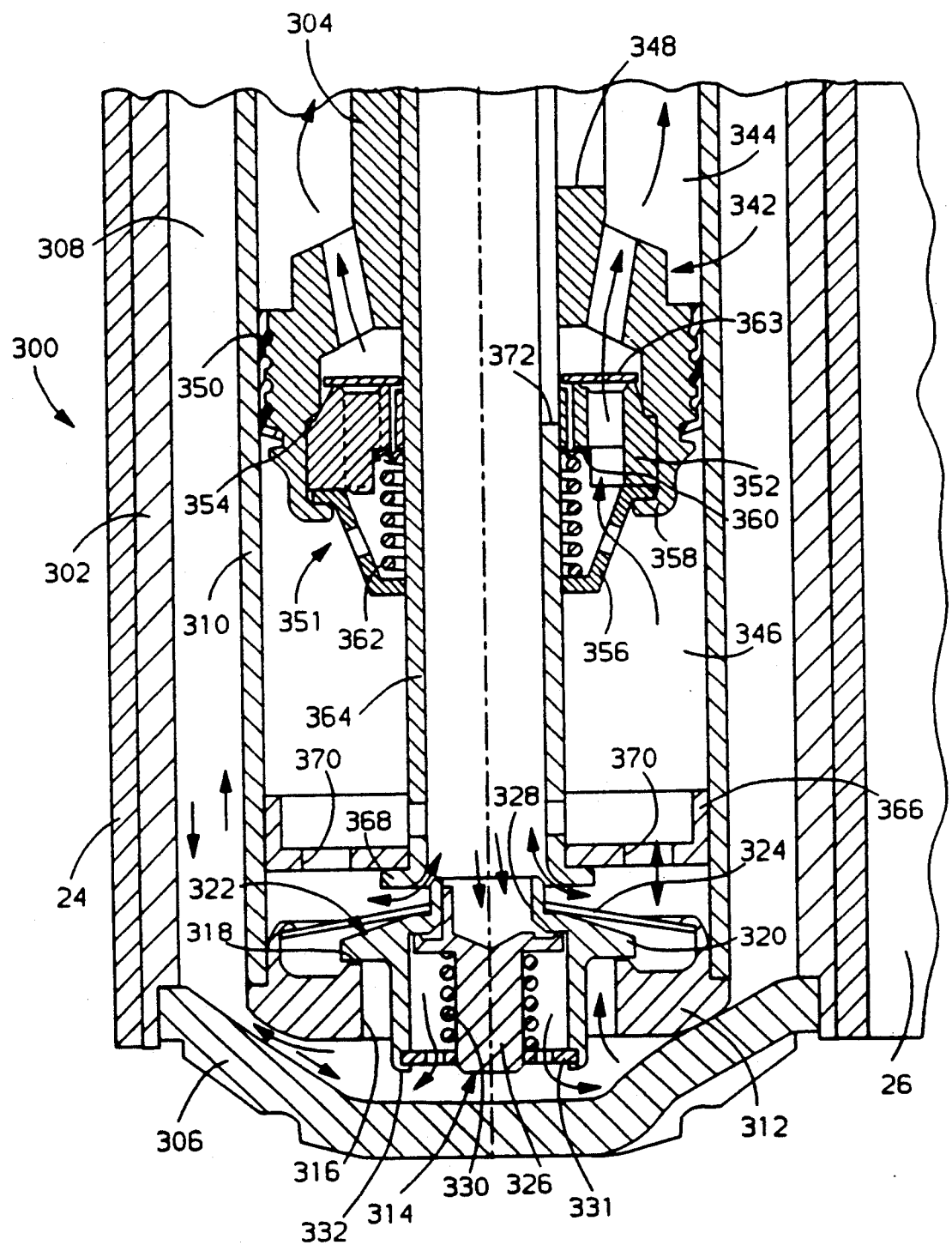
FIG. 12 is an enlarged axial sectional view of a lower portion of the strut of FIG. 8 illustrating fluid flow through a piston valving assembly, a base valve assembly and the bypass tube.

A base valve assembly 314 (illustrated best in FIG. 12) is mounted on the cylinder end 312 and controls the flow of fluid passing between the interior volume of the inner cylinder 310 and the reservoir 308. A central bore 316 in the cylinder end 312 ringed by an annular valve seat 318 receives an annular flange 320 of a valve cage 322. A finger spring 324 retains the valve cage 322 on the valve seat 318. The valve cage 322 has an internal axially positioned valve 326. The valve 326 has an annular valve seat 328 held in contact against the valve cage 322 by a compression spring 330 mounted against a retainer plate 331. The retainer plate 331 is held in place by a radially inwardly coined skirt 332 of the valve cage 322. The valve 326 and the spring 330 move downwardly to permit the flow of hydraulic fluid into the reservoir 308 from the inner cylinder 310 during a compression stroke of the strut 300. The valve cage 322 moves upwardly against the finger spring 324 to permit the flow of fluid from the reservoir 308 into the inner cylinder 310 during a rebound stroke of the strut 300.

The upper end of the inner cylinder 310 is closed by a cylindrical piston rod guide 334 (FIG. 8) having an inner bushing 335 slidably receiving the piston rod 304. The piston rod guide 334 is formed with a counter bore 336 in its upper end. An annular elastomeric seal assembly 338 is received in the counter bore 336 and surrounds the piston rod 304. A seal cover 340 retains the seal 338 in place and is fitted between an outer surface of the piston rod guide 334 and an inner surface of the reservoir tube 302. The reservoir tube 302 can be secured to the seal cover 340 by an annular weld, thereby axially loading the inner cylinder 310 against the base cup 306 to prohibit relative motion of the base cup 306 and the inner cylinder 310 when a steering force is transferred to the reservoir tube 302 from the spindle and hub assembly 12.

The piston rod 304 is a hollow cylindrical member having a cylindrical piston indicated generally at 342 secured to its lower end. The piston 342 divides the interior of the inner cylinder 310 into an upper chamber 344 and a lower chamber 346. A longitudinal slot 348 is provided through the circumference of the piston rod 304 to provide fluid communication between the upper and lower chambers 344, 346 as described below.

Figure 11:
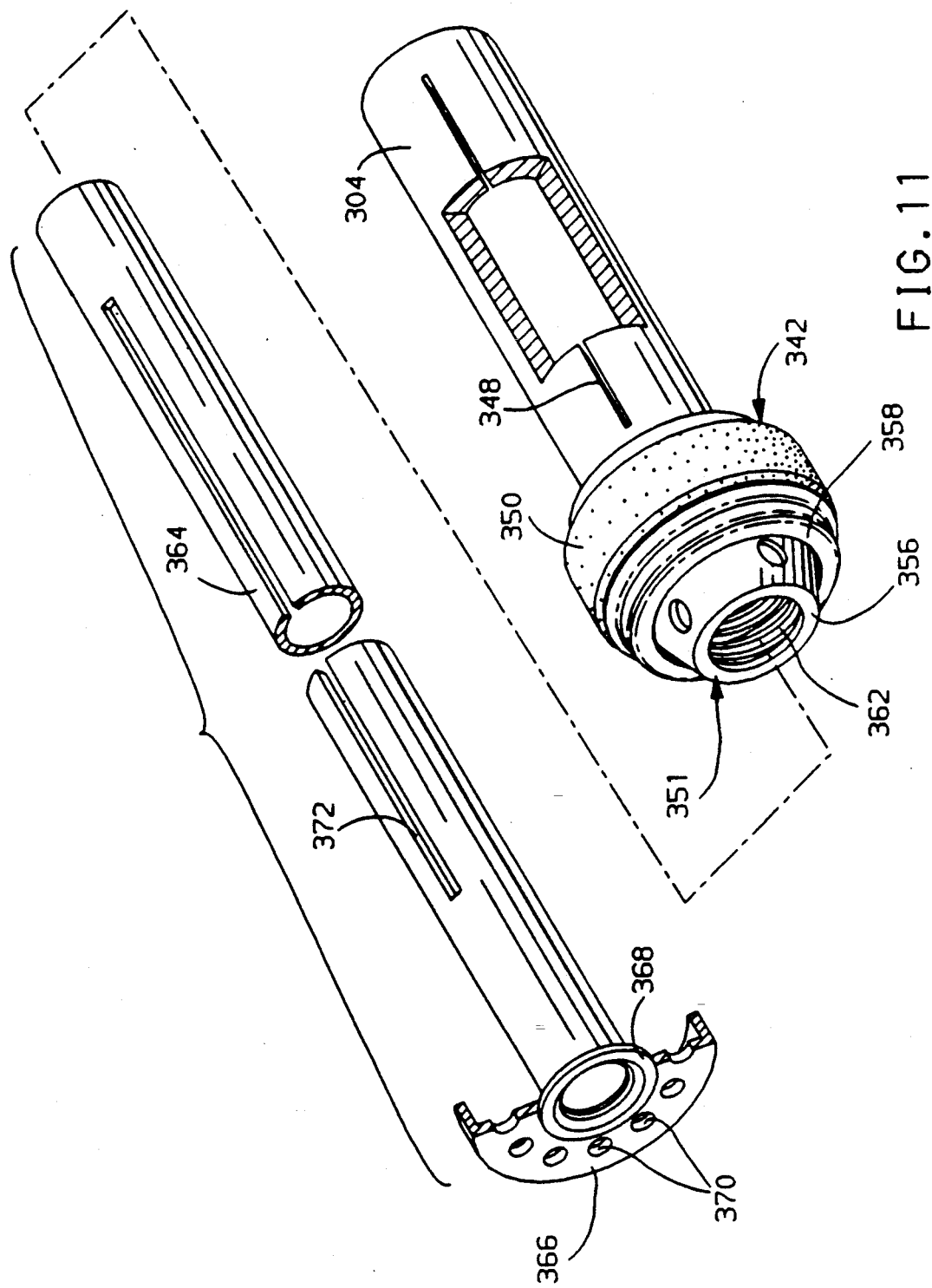
FIG. 11 is an exploded perspective view of the bypass tube and tube support and the piston and piston rod of the strut of FIG. 8 wherein a portion of the piston rod has been cut away.

As illustrated best in FIG. 11, a sealing band 350, preferably formed from TEFLON, is provided around the circumference of the piston 342 and provides a seal at the inner surface of the inner cylinder 310. A piston valving assembly 351, illustrated best in FIG. 2, includes a cylindrical orifice plate 352 peripherally secured between an inner locator shoulder 54 and a spring retainer 356. An annular skirt 358 is radially inwardly coined to secure the spring retainer 356 to the piston 342. A valve disk 360 is held against the lower surface of the orifice plate 352 by a helical spring 362. An intake disk 363 is mounted on an upper surface of the orifice plate 352 in a conventional manner.

Figure 9:
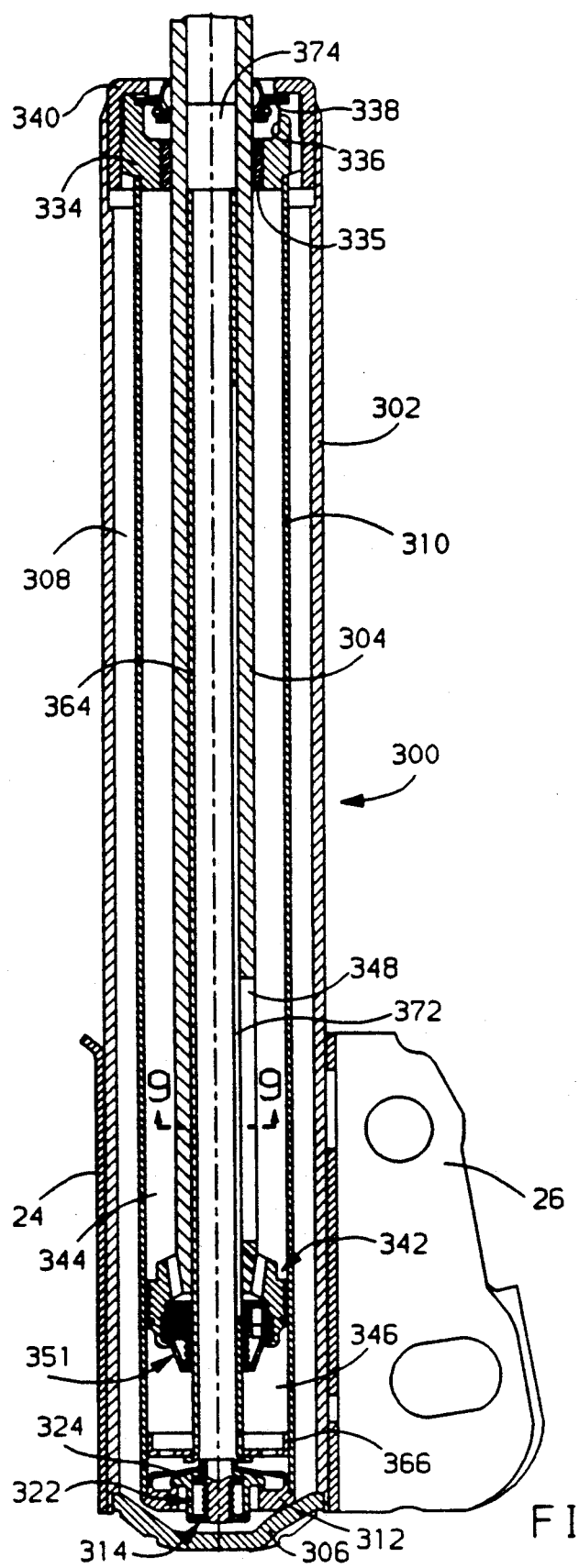
FIG. 9 is a sectional view taken along line 9—9 of FIG. 8 illustrating the alignment of the axial slot of the bypass tube with the axial slot of the piston rod.
Figure 9:
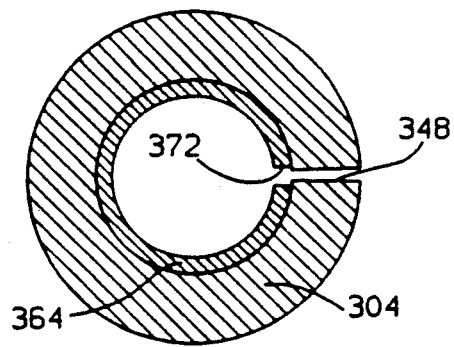
Figure 10:
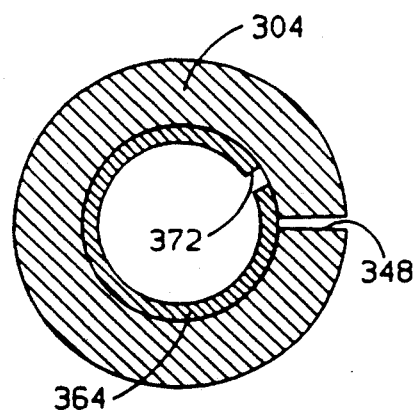
FIG. 10 is a view similar to FIG. 9 illustrating the disalignment of the axial slots caused by the counterclockwise rotation of the bypass tube resulting from a steering operation of a wheel assembly.

A bypass tube 364 having a diameter slightly less than the diameter of the spring 362 is axially mounted through the piston valving assembly 351 and is slidably received in an axial shaft of the piston rod 304. A tube support 366 is fixedly mounted in the lower chamber 346 of the inner cylinder 310 above the cylinder end 312. The lower end of the bypass tube 364 is supported by the tube support 366 in any suitable manner, including a flange 368 secured to the tube support 366. A plurality of fluid openings 370 are provided in the tube support 366 and surround the bypass tube 364. A longitudinal slot 372 is provided in the outer circumference of the bypass tube 364. When assembled in the piston rod 304, the axial slot 372 is aligned with the longitudinal slot 348 of the piston rod 304, as illustrated in FIG. 9. Preferably, a plug 374 is provided at the upper end of the piston rod 304 to seal the bypass tube 364.

During operation, the bypass tube 364 is stationary with respect to the inner cylinder 310. During compression of the strut 300, when the piston rod 304 and piston 342 move downwardly toward the base valve assembly 314, fluid is forced upwardly through the piston valving assembly 351 and the hollow chamber of the bypass tube 364, as well as downwardly through the base valve assembly 314. As the spindle and hub assembly 12 is turned to steer a vehicle, the rotational movement is transmitted through the arm 28 and the connected assembly of the reservoir tube 302, the inner cylinder 310, the tube support 366, and the bypass tube 364. When the orientation of the spindle and hub assembly 12 results in the alignment of the axial slot 372 of the bypass tube 364 and the axial slot 348 of the piston rod 304, fluid is permitted to pass upwardly into the bypass tube 364 and through the aligned slots 348, 372 into the upper chamber 344. In this manner, the strut provides a "soft" damping rate.

When the spindle and hub assembly 12 is turned to steer a vehicle, the bypass tube 364 is rotated with respect to the piston rod 304, so that the axial slot 372 of the bypass tube 364 does not align with the axial slot of the piston rod 304. When the slots 348, 372 are not aligned, fluid does not pass from the bypass tube 364 to the upper chamber 344 and the fluid in the lower chamber 346 is forced through the base valve assembly 314 as the piston rod 304 reciprocates. This mode of operation provides a "hard" damping rate for the strut 300, which can improve the handling of a vehicle particularly during a full turn or cornering.

The strut provides two-stage variable damping. The first stage, a "soft" damping rate, occurs when the slots 348, 372 are aligned. A second stage, "hard" damping, occurs when the slots 348, 372 are not aligned. It is appreciated that the lengths and the widths or arcs of the slots 348, 372 can be varied to provide a desired damping characteristic.

The present invention provides an economical variable damper which is sensitive to the steering motion in a wheel assembly. During straight-ahead driving, the damping of the present strut 100, 200, 300 can be tuned to provide a soft and comfortable ride. However, during turning or cornering, when the wheel assemblies are rotated, the bypass fluid channels of the struts 100, 200, 300 are closed so that all the fluid in the lower chamber must pass through the exiting piston valving assemblies and base valve assemblies, thereby producing a stiffer ride which can improve handling of a vehicle.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A hydraulic damper for controlling the compression and rebound action of a vehicle suspension spring, the damper comprising:
   (a) a reservoir tube connected to a steerable wheel assembly;
   (b) an inner cylinder fixedly mounted within the reservoir tube and cooperating therewith to form a reservoir for a damper fluid connected within the reservoir tube and the inner cylinder;
   (c) base valve means operatively mounted at one end of the inner cylinder for controlling the flow between the inner cylinder and the reservoir tube;
   (d) a piston rod operatively mounted for reciprocating movement in the inner cylinder and extending through an upper end of the damper;
   (e) a piston secured to an inner end of the piston rod and dividing the interior of the inner cylinder into upper and lower chambers, the piston slidably mounted in the inner cylinder for both reciprocable and rotary motion with respect to the inner cylinder;
   (f) piston valving means in the piston establishing a restricted flow path through the piston between the upper and lower chambers during compression and rebound of the damper; and
   (g) bypass valving means establishing a variable flow between the upper and lower chambers through the piston, the bypass valving means including first and second elements, wherein at least one of the elements has aperture means opened and closed by the relative rotation between the elements provided by a steering motion of a vehicle and transmitted through the reservoir tube and the piston rod.

2. The damper as specified in claim 1 wherein the bypass valving means comprises:
   (a) a plurality of fluid bypass channels provided in the piston;
   (b) a rotatable valve disk mounted on the piston and having ports corresponding with the bypass channels; and
   (c) tab means provided on the circumference of the valve disk keyed with complementary longitudinal slots in an inner surface of the inner cylinder;
   whereby rotation of the reservoir tube and inner cylinder is transmitted by the slots and tab means to the valve disk to selectively align the ports with the bypass channels.

3. The damper specified in claim 1 wherein the bypass valving means comprises:
   (a) a receiver plate assembly having a plurality of fluid openings fixedly mounted in the lower chamber of the inner cylinder; and
   (b) bypass tube means having an elongated hollow tube portion slidably connected to the piston forming a fluid path between the upper and lower chambers, the tube terminating in a control plate assembly having a plurality of ports rotatably mounted in the receiver plate assembly, whereby rotation of the reservoir tube and inner cylinder is transmitted to the receiver plate assembly to selectively align the respective ports and openings of the control and receiver plate assemblies.

4. The damper specified in claim 1 wherein the bypass valving means comprises:
   (a) bypass tube means fixedly mounted at a first end in the lower chamber of the inner cylinder and slidably and rotatably received into the piston and piston rod, the bypass tube means including a longitudinal slot of a predetermined length formed above the piston;
   (b) a longitudinal slot of a predetermined length in the piston rod;
   whereby rotation of the reservoir tube and inner cylinder is transmitted to the bypass tube means to selectively align the longitudinal slots of the bypass tube means and the piston rod.

5. A steer-variable hydraulic damper for vehicular suspension, comprising:
   (a) a fluid-filled cylinder;
   (b) a piston slidably mounted in the cylinder for both reciprocable and rotary motions and dividing the interior of the cylinder into first and second chambers;
   (c) a piston rod fixedly connected at a first end to the piston and fixedly connected at a second end to a vehicle;
   (d) piston valving means establishing a restricted flow path through the piston between the first and second chambers during compression and rebound of the damper; and
   (e) bypass valving means establishing a variable flow between the first and second chambers, the bypass valving means including a first element rotatably fixed to the cylinder and a second element rotatably fixed to the piston wherein aperture means provided in one of the elements is opened and closed by the relative rotation between the elements.

6. The damper as specified in claim 5 wherein the bypass valving means comprises:
   (a) a plurality of fluid bypass channels provided in the piston;
   (b) a rotatable valve disk mounted on the piston and having ports corresponding with the bypass channels; and
   (c) tab means provided on the circumference of the valve disk keyed with complementary longitudinal slots in an inner surface of the cylinder;
   whereby rotation of the cylinder is transmitted by the slots and tab means to the valve disk to selectively align the ports with the bypass channels.

7. The damper specified in claim 5 wherein the bypass valving means comprises:
   (a) a receiver plate assembly having a plurality of fluid openings fixedly mounted in the lower chamber of the cylinder; and
   (b) bypass tube means having an elongated hollow tube portion slidably connected to the piston forming a fluid path between the upper and lower chambers, the tube terminating in a control plate assembly having a plurality of ports rotatably mounted in the receiver plate assembly, whereby rotation of the cylinder is transmitted to the receiver plate assembly to selectively align the respective ports and openings of the control and receiver plate assemblies.

8. The damper specified in claim 5 wherein the bypass valving means comprises:
   (a) bypass tube means fixed mounted at a first end in the lower chamber of the cylinder and slidably and rotatably received into the piston and piston rod, the bypass tube means including a longitudinal slot of a predetermined length formed above the piston;
   (b) a longitudinal slot of a predetermined length in the piston rod,
   whereby rotation of the cylinder is transmitted to the bypass tube means to selectively align the longitudinal slots of the bypass tube means and the piston rod.

9. A system for controlling the compression and rebound action of a vehicular suspension spring with a variable hydraulic damper, the system comprising:
   (a) a fluid-filled cylinder reciprocally mounting a piston rod;
   (b) a piston, fixedly connected to the piston rod, slidably mounted in the cylinder for both reciprocable and rotary motions and dividing the interior of the cylinder into first and second chambers;
   (c) means for rotating the cylinder along its axis in response to a steering input to the vehicle;
   (d) means for rotatably fixing the piston rod to the vehicle; and
   (e) valving means establishing a variable flow between the first and second chambers, the valving means including a first element rotatably fixed to the cylinder and a second element rotatably fixed to the piston wherein aperture means provided in one of the elements is opened and closed by the relative rotation between the elements in response to a steering input to the vehicle.

10. The system as specified in claim 9 wherein the valving means comprises:
    (a) a plurality of fluid channels provided in the piston;
    (b) a rotatable valve disk mounted on the piston and having ports corresponding with the fluid channels; and
    (c) tab means provided on the circumference of the valve disk keyed with complementary longitudinal slots in an inner surface of the cylinder,
    whereby rotation of the cylinder is transmitted by the slots and tab means to the valve disk to selectively align the ports with the fluid channels.

11. The system specified in claim 9 wherein the valving means comprises:
    (a) a receiver plate assembly having a plurality of fluid openings fixedly mounted in the lower chamber of the cylinder; and
    (b) tube means having an elongated hollow tube portion slidably connected to the piston forming a fluid path between the upper and lower chambers, the tube terminating in a control plate assembly having a plurality of ports rotatably mounted in the receiver plate assembly, whereby rotation of the cylinder is transmitted to the receiver plate assembly to selectively align the respective ports and openings of the control and receiver plate assemblies.

12. The system specified in claim 9 wherein the valving means comprises:
    (a) tube means fixedly mounted at a first end in the lower chamber of the inner cylinder and slidably and rotatably received into the piston and piston rod, the bypass tube means including a longitudinal slot of a predetermined length formed above the piston;
    (b) a longitudinal slot of a predetermined length in the piston rod;
    whereby rotation of the cylinder is transmitted to the tube means to selectively align the longitudinal slots of the tube means and the piston rod.

* * * * *